(12) United States Patent  
van Schaik

(10) Patent No.: US 10,810,009 B2
(45) Date of Patent: Oct. 20, 2020

(54) VISUALIZATIONS OF SOFTWARE PROJECT AND CONTRIBUTOR ACTIVITY

(71) Applicant: Microsoft Technology Licensing, LLC, Redmond, WA (US)

(72) Inventor: Sebastiaan Johannes van Schaik, Oxford (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/036,791

(22) Filed: Jul. 16, 2018

(65) Prior Publication Data

US 2020/0225943 A1  Jul. 16, 2020

Related U.S. Application Data

(60) Provisional application No. 62/532,775, filed on Jul. 14, 2017.

(51) Int. Cl.
*G06F 8/77* (2018.01)
*G06F 16/9032* (2019.01)
*G06F 9/451* (2018.01)

(52) U.S. Cl.
CPC .............. *G06F 8/77* (2013.01); *G06F 9/451* (2018.02); *G06F 16/90324* (2019.01)

(58) Field of Classification Search
None
See application file for complete search history.

(56) References Cited

U.S. PATENT DOCUMENTS

| | | |
|---|---|---|
| 5,917,500 A | 6/1999 | Johnson et al. |
| 5,917,730 A | 6/1999 | Rittie et al. |
| 6,226,787 B1 | 5/2001 | Serra et al. |
| 7,174,536 B1 | 2/2007 | Kothari et al. |
| 7,505,952 B1 | 3/2009 | Engler et al. |

(Continued)

FOREIGN PATENT DOCUMENTS

EP  2784665  10/2014

OTHER PUBLICATIONS

Avgustinov, Tracking Static Analysis Violations Over Time to Capture Developer Characteristics, 2015, 2015 IEEE/ACM 37th IEEE International Conference on Software Engineering (Year: 2015).*

(Continued)

*Primary Examiner* — Hossain M Morshed
(74) *Attorney, Agent, or Firm* — Workman Nydegger

(57) ABSTRACT

Methods, systems, and apparatus, including computer programs encoded on computer storage media, for presenting static analysis user interface presentations. One of the methods includes receiving, from a user, a request for a user interface presentation representing multiple properties of source code snapshots committed to a project versus time. A plurality of snapshots are obtained for the project, wherein each snapshot comprises a representation of source code for the project at a respective time period. Multiple snapshot metrics are computed for each snapshot, including a net violation count and a count of lines of code added or removed. A graphical user interface presentation is generated that correlates periodic lines of code metrics with overall violation metrics.

21 Claims, 6 Drawing Sheets

(56) References Cited

U.S. PATENT DOCUMENTS

| | | | | |
|---|---|---|---|---|
| 7,904,802 | B1* | 3/2011 | Kolawa | G06Q 10/103 |
| | | | | 715/230 |
| 8,336,030 | B1* | 12/2012 | Boissy | G06F 8/71 |
| | | | | 717/122 |
| 8,918,712 | B2* | 12/2014 | Nario | H04W 4/50 |
| | | | | 715/239 |
| 9,262,157 | B2 | 2/2016 | Henriksen et al. | |
| 9,268,665 | B2* | 2/2016 | Barrow | G06F 8/77 |
| 9,569,198 | B2* | 2/2017 | Spivak | G06F 9/5055 |
| 9,612,831 | B2* | 4/2017 | Mendis | G06F 8/77 |
| 9,639,353 | B1 | 5/2017 | Henriksen et al. | |
| 9,690,690 | B1* | 6/2017 | Henriksen | G06F 11/3692 |
| 2006/0123389 | A1* | 6/2006 | Kolawa | G06F 11/3616 |
| | | | | 717/101 |
| 2006/0136863 | A1 | 6/2006 | Szpak | |
| 2006/0225124 | A1* | 10/2006 | Kolawa | G06F 21/6218 |
| | | | | 726/1 |
| 2006/0276995 | A1 | 12/2006 | Breitgand et al. | |
| 2006/0293777 | A1* | 12/2006 | Breitgand | H04L 43/16 |
| | | | | 700/108 |
| 2007/0044075 | A1 | 2/2007 | Koning et al. | |
| 2009/0241104 | A1* | 9/2009 | Amiga | G06F 8/71 |
| | | | | 717/174 |
| 2009/0288068 | A1* | 11/2009 | Gunsel | G06F 8/36 |
| | | | | 717/116 |
| 2010/0023738 | A1* | 1/2010 | Sheehan | G06F 9/44505 |
| | | | | 713/1 |
| 2010/0050155 | A1* | 2/2010 | Iwama | G06F 11/3604 |
| | | | | 717/120 |
| 2010/0333069 | A1* | 12/2010 | Chandra | G06F 8/75 |
| | | | | 717/126 |
| 2011/0283270 | A1* | 11/2011 | Gass | G06F 8/65 |
| | | | | 717/168 |
| 2011/0320242 | A1 | 12/2011 | Cohen et al. | |
| 2012/0204131 | A1* | 8/2012 | Hoang | G06F 9/445 |
| | | | | 715/835 |
| 2012/0317492 | A1* | 12/2012 | Sheeder | H04N 21/25891 |
| | | | | 715/738 |
| 2012/0324416 | A1* | 12/2012 | Lehner | G06F 11/3616 |
| | | | | 717/101 |
| 2013/0219155 | A1* | 8/2013 | Barrus | G06F 9/44505 |
| | | | | 713/1 |
| 2013/0226555 | A1* | 8/2013 | Lerum | G06F 9/454 |
| | | | | 704/2 |
| 2013/0305224 | A1 | 11/2013 | Eade et al. | |
| 2014/0258351 | A1* | 9/2014 | Laron | G06F 16/1873 |
| | | | | 707/829 |
| 2014/0359602 | A1* | 12/2014 | Sawaya | G06F 8/61 |
| | | | | 717/176 |
| 2015/0370428 | A1* | 12/2015 | Chan | G06F 16/27 |
| | | | | 715/739 |
| 2017/0286913 | A1* | 10/2017 | Liu | G06Q 10/109 |
| 2018/0046472 | A1* | 2/2018 | Yan | G06F 9/44505 |

OTHER PUBLICATIONS

BigQuery, "Saving and Sharing Queries", 2017, https://cloud.google.com/bigquery/docs/saving-sharing-queries (Year: 2017).*

Palix, Tracking Code Patterns over Multiple Software Versions with Herodotos, 2010, AOSD'10 Mar. 15-19, Rennes and St. Malo, France, Copyright 2010 ACM 978-1-60558-958-9/10/03 (Year: 2010).* eHowTech, "How to overlap two different types of graphs in Excel", YouTube, 2013, at https://www.youtube.com/watch?v=PgHa16Yw5bM (Year: 2013).*

Mujumdar, "Crowdsourcing Suggestions to Programming Problems for Dynamic Web Development Languages", 2011, ACM (Year: 2011).*

Avgustinov et al., "Tracking Static Analysis Violations Over Time to Capture Developer Characteristics," May 2015, IEEE, p. 437-447.

Ayewah et al., "Using Static Analysis to Find Bugs", IEEE Software, vol. 25, No. 5, 2008, 8 pages.

Boogerd et al., "Evaluating the Relation Between Coding Standard Violations and Faults Within and Across Software Versions", Delft University of Technology, Software Engineering Research Group, Technical Report Series, Aug. 2009, 14 pages.

European Search Report in EP Application No. 15164947.2, dated Sep. 10, 2015, 11 pages.

Gousios et al., "Measuring Developer Contribution from Software Repository Data," May 2008, ACM, p. 129-132.

Hunt et al., "A Fast Algorithm for Computing Longest Common Subsequences", Communications of the ACM, vol. 20, No. 5, May 1977, 4 pages.

Johnson et al., "Why Don't Software Developers Use Static Analysis Tools to Find Bugs?" ICSE, 2013, 10 pages.

Kim et al., "Program Element Matching for Multi-Version Program Analyses", MSR, May 2006, 7 pages.

Kim et al., "When Functions Change Their Names: Automatic Detection of Origin Relationship", WCRE, 2005, 10 pages.

Kim et al., "Which Warnings Should I Fix First?", ESEC-FSE, Sep. 2007, 10 pages.

Komondoor et al., "Using Slicing to Identify Duplication in Source Code", SAS, 2001, 18 pages.

Myers, "An O(ND) Difference Algorithm and its Variations", *Algorithmica*, 1986, 15 pages.

Nagappan et al., "Static Analysis Tools as Early Indicators of Pre-Release Defect Density", ICSE, 2005, 8 pages.

Olague et al., "Empirical Validation of Three Software Metrics Suites to Predict Fault-Proneness of Object-Oriented Classes Developed Using Highly Iterative or Agile Software Development Processes", IEEE TSE, vol. 33, No. 6, 2007, 18 pages.

Palix et al., "Tracking code patterns over multiple software versions with herodotos," Proceedings of the eighth Internataionl Conference on Aspect-Oriented Software Development, AOSD '10, Mar. 2010, pp. 169-180.

Sliwerski et al, "When Do Changes Induce Fixes?", MSR, May 2005, 5 pages.

Spacco et al., "Tracking Defect Warnings Across Versions", MSR, May 2006, 4 pages.

Subramanyam et al., "Empirical Analysis of CK Metrics for Object-Oriented Design Complexity: Implications for Software Defects", IEEE TSE, vol. 29, No. 4, 2003, 14 pages.

Vetró et al., "An Empirical Validation of FindBugs Issues Related to Defects", 15th Annual Conference on Evaluation & Assessment in Software Engineering (EASE), Apr. 2011, 11 pages.

Vetró, "Using Automatic Static Analysis to Identify Technical Debt", ICSE, 2012, 3 pages.

Zheng et a., "On the Value of Static Analysis for Fault Detection in Software", IEEE TSE, vol. 32, No. 4, 2006, 14 pages.

\* cited by examiner

VISUALIZATIONS OF SOFTWARE PROJECT AND CONTRIBUTOR ACTIVITY

CROSS-REFERENCE TO RELATED APPLICATIONS

This application claims the benefit under 35 U.S.C. § 119(e) of the filing date of U.S. Provisional Patent Application No. 62/532,775, filed on Jul. 14, 2017, entitled "VISUALIZATIONS OF SOFTWARE PROJECT AND CONTRIBUTOR ACTIVITY," the entirety of which is herein incorporated by reference.

BACKGROUND

This specification relates to static analysis of computer software source code.

Static analysis refers to techniques for analyzing computer software source code without executing the source code as a computer software program.

Source code is typically maintained by developers in a code base of source code using a version control system. Version control systems generally maintain multiple revisions of the source code in the code base, each revision being referred to as a snapshot. Each snapshot includes the source code of files of the code base as the files existed at a particular point in time.

A static analysis system can analyze source code of a particular snapshot of the code base to identify characteristic segments of source code in the snapshot. For example, a static analysis system can identify violations in the source code of a particular set of coding standards. A static analysis system can also identify a responsible contributor for each characteristic segment of source code and attribute the characteristic segment to the responsible contributor, e.g., to a particular developer or group of developers.

A static analysis system can analyze projects using a collection of static analysis rules, which can simply be referred to as rules. Each rule defines a different potential problem with source code in a particular programming language. Each rule specifies one or more attributes for one or more source code elements, one or more relationships between source code elements, or some combination of these. For example, a rule can specify that a potential problem exists when a function is called with an unexpected number of arguments, e.g., more arguments than a number of arguments that are specified by the definition of the function.

Static analysis rules in the collection can also define, among other things, when source code elements violate one or more coding standards. Such instances will be referred to as coding defects. Coding defects can be represented by data elements that will be referred to as violations. A static analysis system can use any appropriate set of coding standards for identifying coding defects, e.g., the NASA Jet Propulsion Laboratory Institutional Coding Standard for the Java Programming Language, available at http://lars lab.jpl.nasa.gov/JPL_Coding_Standard_Java.pdf. The types of coding defects that a static analysis system can identify include correctness standards on coding concurrent processes, maintainability standards on eliminating duplicate code segments, readability standards on reducing code complexity, and framework standards on using code libraries, to name just a few examples.

A static analysis system can analyze the source code of a project to find instances in which source code elements satisfy rules in the collection of rules. Some static analysis systems define rules using query languages, e.g., Datalog or SQL. For example, a static analysis system can parse the source code in a project to populate a database that stores properties of source code elements in the project. A static analysis system can then use a query language to query the database to identify instances of source code elements that satisfy one or more rules.

When a rule is satisfied by one or more source code elements, a static analysis system can generate an alert. An alert is data that specifies which rule has been satisfied, which source code elements are involved, and where in the code base the implicated source code elements are located. A static analysis system can then present alerts in a user interface presentation for consumption by one or more developers of the project. The alerts guide the developers on how to improve the quality of the source code in the project, e.g., by indicating potential problems that can be fixed.

SUMMARY

This specification describes how a static analysis system can generate graphical user interface presentations for visualizing the quantity and quality of software project and developer activity. One graphical user interface presentation shows the development of quality metrics, e.g., net number of violations in a project, and quantity metrics, e.g., total number of lines of code in a project, over time. Another graphical user interface presentation shows the quality and quantity of contributions from different contributions over a predetermined time period.

This specification further describes how a static analysis system can perform crowd-sourcing of queries that define characteristic segments of source code. A first user can provide a query defining a characteristic segment of source code, e.g., an instance of a bug, in a project as input to a query box presented in a graphical user interface presentation. The query can be executed by the system over multiple different software projects and made available as a known query to other users such that, when a second user uses the query box, the query is provided as a suggested query to identify the characteristic segments of source code in one or more other projects.

Particular embodiments of the subject matter described in this specification can be implemented so as to realize one or more of the following advantages. Graphical user interface presentations showing the quantity and quality of software project and developer activity, as described in this specification, can provide valuable insight into the productivity and quality of people and groups of people contributing to a software development project. This information can be used to improve team performance and to help guide the selection of developers for various training programs and team assignments. This information can also be used to improve team productivity.

A static analysis system implementing query crowd-sourcing, as described in this specification, enables characteristic segments of source code, e.g., bugs or segments introducing inefficiencies, to be identified more readily by multiple users over multiple projects. Improved identification of characteristic segments of source code over multiple projects may improve the quality and efficiency of said projects.

The details of one or more embodiments of the subject matter of this specification are set forth in the accompanying drawings and the description below. Other features, aspects,

BRIEF DESCRIPTION OF THE DRAWINGS

Like reference numbers and designations in the various drawings indicate like elements.

DETAILED DESCRIPTION

Figure 1:
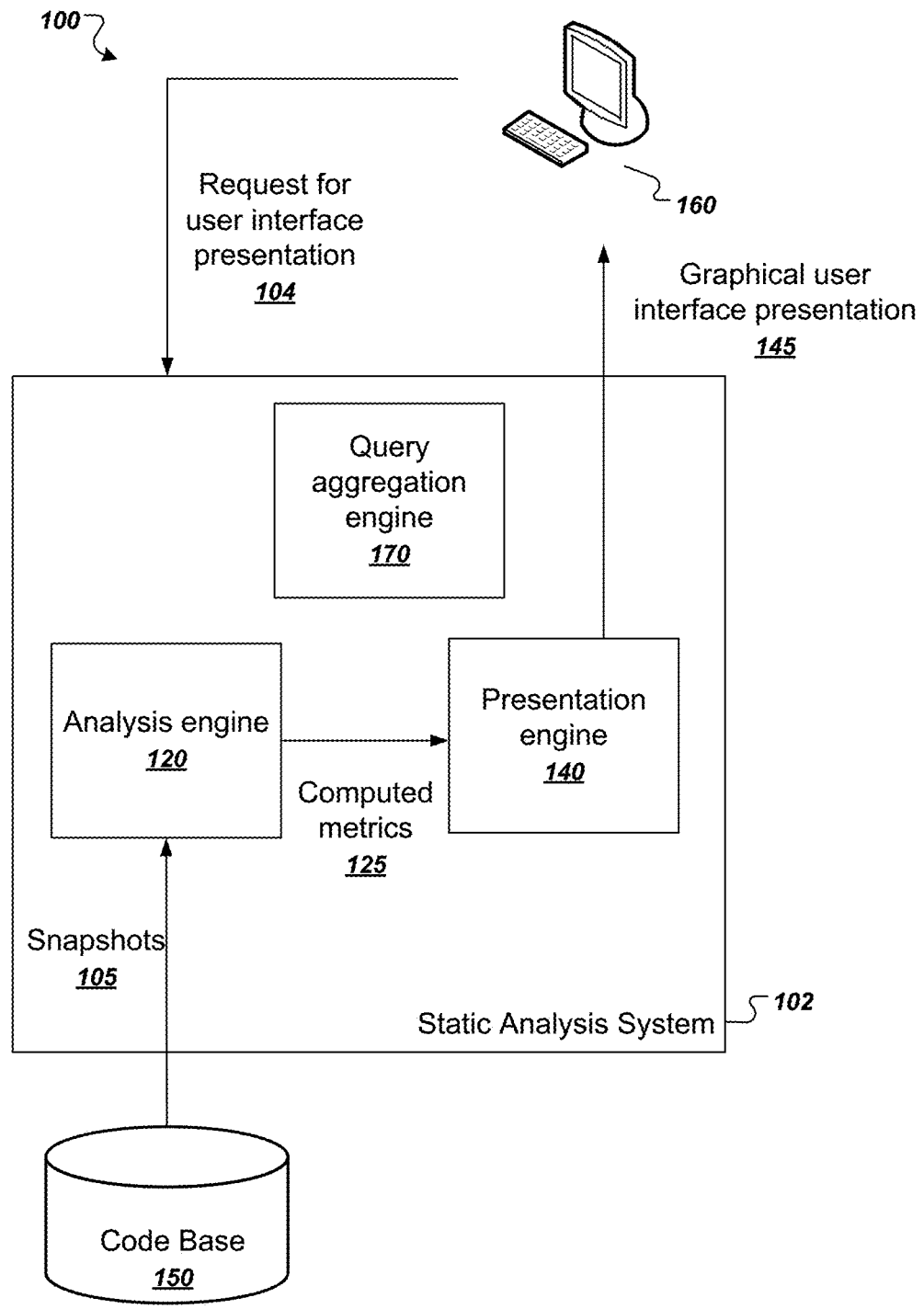
FIG. 1 illustrates an example system.

Static analysis can be performed on a code base, which may be referred to as a project. The project generally includes a collection of source code files organized in a particular way, e.g., arranged in a hierarchical directory structure, with each source code file in the project having a respective path.

Static analysis techniques include techniques for identifying violations of coding standards. In the systems described below, violations will be represented by data elements that will also be referred to simply as violations when the meaning is clear from context.

A static analysis system can use any appropriate set of coding standards for identifying violations, e.g., the NASA Jet Propulsion Laboratory Institutional Coding Standard for the Java Programming Language, available at http://lars-lab.jpl.nasa.gov/JPL_Coding_Standard_Java.pdf. The types of violations that a static analysis system can identify include correctness standards on coding concurrent processes, maintainability standards on eliminating duplicate code segments, readability standards on reducing code complexity, and framework standards on using code libraries, to name just a few examples.

In Table 1, below, is an example segment of source code that contains a violation, indicated by the underlined text. The line numbers are line numbers of an example source code file.

TABLE 1

| |
|---|
| 127 Set<String> revs; |
| ... |
| 162 for (IRevision rev : new ArrayList<IRevision>(keep)) { |
| 163    if (!revs.contains(rev)) { |
| ... |
| 179    } |
| 180 } |

On line 127, the variable "revs" is declared to be of type "Set<String>". In other words, "revs" is a set of data elements that are character strings. On line 162, the variable "rev" is declared to be of type "IRevision."

On line 163, the source code checks whether the IRevision element "rev" is contained in the string set "revs." This requires a comparison between data elements that are strings and data elements that are of type "IRevision." Thus, the check on line 163 violates a coding standard that comparisons must only performed between variables of the same type. In fact, the check on line 163 will likely always return "false," and thus must be corrected by a developer in order for the program to operate correctly.

A violation data element for a violation in a project can include data representing a snapshot, S, a location, l, and a violation type, t. The location l will specify the location of the source code that violates the applicable coding standard. The source code that violates the standard, which will be referred to as the "violation snippet," will generally be a contiguous segment of source code; however, in some cases, it may be two or more disconnected segments of source code, and the location l will specify all of the corresponding segments. Similarly, the source code will generally be found in one source code file, but may be found in two or more source code files.

The location l of a particular source code violation can be specified by a path of a source code file that includes the particular violation, as well as a start position and an end position of the violation snippet or, if the violation snippet includes multiple segments of source code, multiple start positions and end positions of the multiple segments within the file. Typically, the start and end positions within a file are represented by starting and ending line numbers within the file. The start and end positions may also specify an offset within the line, e.g., a column number or an offset that specifies a number of characters or bytes. For example, a violation data element representing the example violation illustrated above would have a violation snippet "revs.contains(rev)", and a location l that specifies a path of the example file, a beginning line 163 with beginning offset 10, and an ending line 163 with ending offset 28. The start and end positions can also be given by a byte offset within the file as a whole. Additionally, rather than an absolute end position, the end position could be specified as an offset from the start position of the violation.

A violation data element also has a type that indicates what sort of violation the violation is. For example, a violation representing the example violation illustrated above would have a type that indicates that the violation snippet violates a coding standard that forbids comparing data elements that have different types.

A system can also categorize violation types into one of several categories and can maintain a database that records to which category each identified violation belongs. Example violation categories include maintainability violations, resource leak violations, concurrency violations, exception handling violations, and comparison violations, to name just a few examples.

A static analysis system can determine status changes of violations in one particular snapshot relative to another snapshot. In this specification, reference will be made to determining status changes of violations by comparison between a first snapshot S and a second snapshot T. The snapshot S may represent the source code files of the project at an earlier point in time than the snapshot T The snapshot S and the snapshot T may also have a parent/child relationship in a revision graph. A first snapshot is a "parent" of a second snapshot when a commit of the first snapshot is a parent in the revision graph of a commit of the second snapshot. Similarly, a first snapshot is a "child" of a second snapshot when a commit of the first snapshot is a child in the revision graph of a commit of the second snapshot.

However, snapshots being compared need not have any particular relationship at all. In fact, the snapshot T may represent an earlier snapshot of the project than the snapshot S. The snapshot S and the snapshot T may be illustrated as adjacent in a revision graph; however, this is not required.

Status changes include the introduction of violations that were introduced in the snapshot T relative to the snapshot S as well as the removal of violations that were removed from the snapshot S relative to the snapshot T Violations that were introduced in the snapshot T relative to S are violations that occur in the snapshot T but do not occur in the snapshot S. Conversely, violations that were removed from the snapshot S relative to T are violations that occur in the snapshot S but do not occur in the snapshot T.

Two violations match each other if they refer to the same coding defect in their respective code bases. In other words, a violation v in a first snapshot S matches a violation w in a second snapshot T if v refers to the same coding defect in the snapshot S as w does in the snapshot T. A static analysis system can determine which violations in S match those in T. Given a set V of violations in S, and a set W of violations in T, a static analysis system can determine a set M of violations in V that have a matching violation in W, and a set N of violations in W that have a matching violation in V. The static analysis system can further require that no two elements of M match the same violation in W, and that no two elements of N match the same violation in V. The static analysis system can also determine a set P of violations that occur in V but do not match any violation in W, and a second set Q of violations that occur in W but do not match any violation in V.

In a common situation where the snapshot S and the snapshot T are from the same code base and the snapshot S is a sole parent of the snapshot T in a revision graph, the set M represents the set of violations in S that were uncorrected in the code base between the snapshots S and T; the set P represents the set of violations in S that were removed from the code base in snapshot T; and, the set Q represents the set of violations that were introduced into the code base in snapshot T.

In this specification, the term "matching violation" may be used to refer to a violation in a snapshot S, a violation in a snapshot T, or to a pair of matching violations in the snapshots S and T, as will be apparent from the context.

Because pairs of matching violations represent the same coding defect, pairs of matching violations have the same type. However, the matching violations of a pair may, but need not, have identical violation snippets. Similarly, matching violations of a pair may, but need not, occur at a same location within a file in the snapshot S and the snapshot T Likewise, matching violations of a pair may, but need not, occur within a same file in the snapshot S and the snapshot T.

A static analysis system can attribute violation status changes to a particular developer entity by identifying violations that do not match each other between two snapshots. In the case described above, when S is a sole parent of T, the removal of the violations in P and the introduction of the violations in Q could be attributed to a responsible entity, e.g., a developer or a team of developers, that committed the snapshot T. A "developer" in this context may actually refer to a group or team of developers responsible for the snapshot T. Techniques for attributing violation status changes are described in commonly-owned U.S. patent application Ser. No. 14/696,185, now U.S. Pat. No. 9,262, 157, which is herein incorporated by reference.

In this specification, a developer entity can be a single developer or a group of multiple developers. For example, a developer entity can be developers on a team, developers within a department of an organization, or any other appropriate group of developers. For clarity of presentation, where a single developer is mentioned, the same techniques can be applied equally to any appropriate developer entity.

FIG. 1 illustrates an example system 100. The system 100 includes a user device 160 in communication with a static analysis system 102. The static analysis system 102 includes multiple functional components, including an analysis engine 120, a query aggregation engine 170, and a presentation engine 140. The components of the static analysis system 102 can be implemented as computer programs installed on one or more computers in one or more locations that are coupled to each through a network. The static analysis system 102 is an example of an online static-analysis system that provides cloud-based source code analysis over hundreds or thousands of software projects.

The user device 160 can communicate with the static analysis system 102 over the network 170, which can be any appropriate communications network, e.g., an intranet or the Internet, or combination of them. For example, a user of user device 160 can provide a request for a user interface presentation 104 to the static analysis system. Alternatively, the static analysis system 102 can be installed in whole or in part on the user device 160. The user of user device 160 can also communicate with the static analysis system 102 in order to specify a software developer project and time period associated with the project.

The request can specify one of a number of different user interface presentations for a particular software project or software projects. For example, the request can request a project history visualization or a project contributor overview. These presentations are described in more detail below. The static analysis system 102 can respond to the request 104 with a graphical user interface presentation 145 corresponding to the requested presentation type.

The static analysis system can generate the graphical user interface presentation 145 using snapshot metrics that are computed from analyzing snapshots of source code projects. Analyzing the snapshots and computing the snapshot metrics are computationally intensive operations that can all be computed before the request 104 is received. Alternatively, the static analysis system 102 can perform these operations in an online fashion after the request is received. For clarity of presentation, the following description of the example system 100 describes the online approach.

After receiving the request 104, the analysis engine 120 obtains relevant snapshots 105 from the code base 150 of the project for analysis. For example, the analysis engine 120 may identify a project and a time period associated with the user request and obtain snapshots 105 from the code base 150 from the project within the time period.

The analysis engine 120 is configured to analyze the obtained snapshots 205 and compute multiple values of snapshot metrics for developer entities that contributed source code to the code base 150. For example, the analysis engine 120 can compute a respective measure of churn for each developer entity that committed one or more snapshots to the code base 150, where a unit of churn indicates a line of code added, changed, or deleted by the developer entity in the code base 150. As another example, the analysis engine 120 can identify source code violations that occur in the obtained snapshots 105 attributed to each developer entity. As another example, the analysis engine 120 can compute counts of lines of code added, removed, or net lines of code added by developer entities. The analysis engine 120 can analyze code snapshots 105 in the code base 150 and compute multiple values of snapshot metrics in parallel for all snapshots, e.g., using a parallel processing framework.

The analysis engine 120 provides the computed snapshot metrics 125 to the presentation engine 140. The presentation engine 140 is configured to generate a graphical user interface presentation 145 using the received computed metrics. For example, the presentation engine 140 may be configured to generate a project history visualization representing multiple properties of source code snapshots committed to a project versus time. As another example, the presentation engine 140 may be configured to generate a project contributor overview representing a quantity metric versus a quality metric attributed to responsible entities that contributed source code to a project. In some cases a generated graphical user interface presentation may include a query box that is configured to receive queries specifying characteristic segments of source code. Other suitable user interfaces that can be generated by the static analysis system 102 are described in commonly owned U.S. patent application Ser. No. 15/269,730, now U.S. Pat. No. 9,639,353, which is herein incorporated by reference.

The static analysis system 102 can then provide as output a graphical user interface presentation 145 in response to receiving the request from the user device 160.

The static analysis system 102 can also implement techniques for suggesting static analysis queries to users of the system. To do so, the system can use a query aggregation engine 170 that generates statics of user-provided queries that are submitted to the static analysis system. The query aggregation engine 170 can receive an indication of user-provided queries that are to be made available as suggestions to other users of the system. The query aggregation engine 170 can compute a score for each user-provided query based on a variety of factors, e.g., how many times the query was selected for execution by other users. The query aggregation engine 170 can then provide the selected query suggestion back to the user device for presentation to a user, either in a separate user interface presentation or alongside any of the aforementioned user interface presentations. This process is described in more detail below with reference to FIG. 6.

Figure 2:
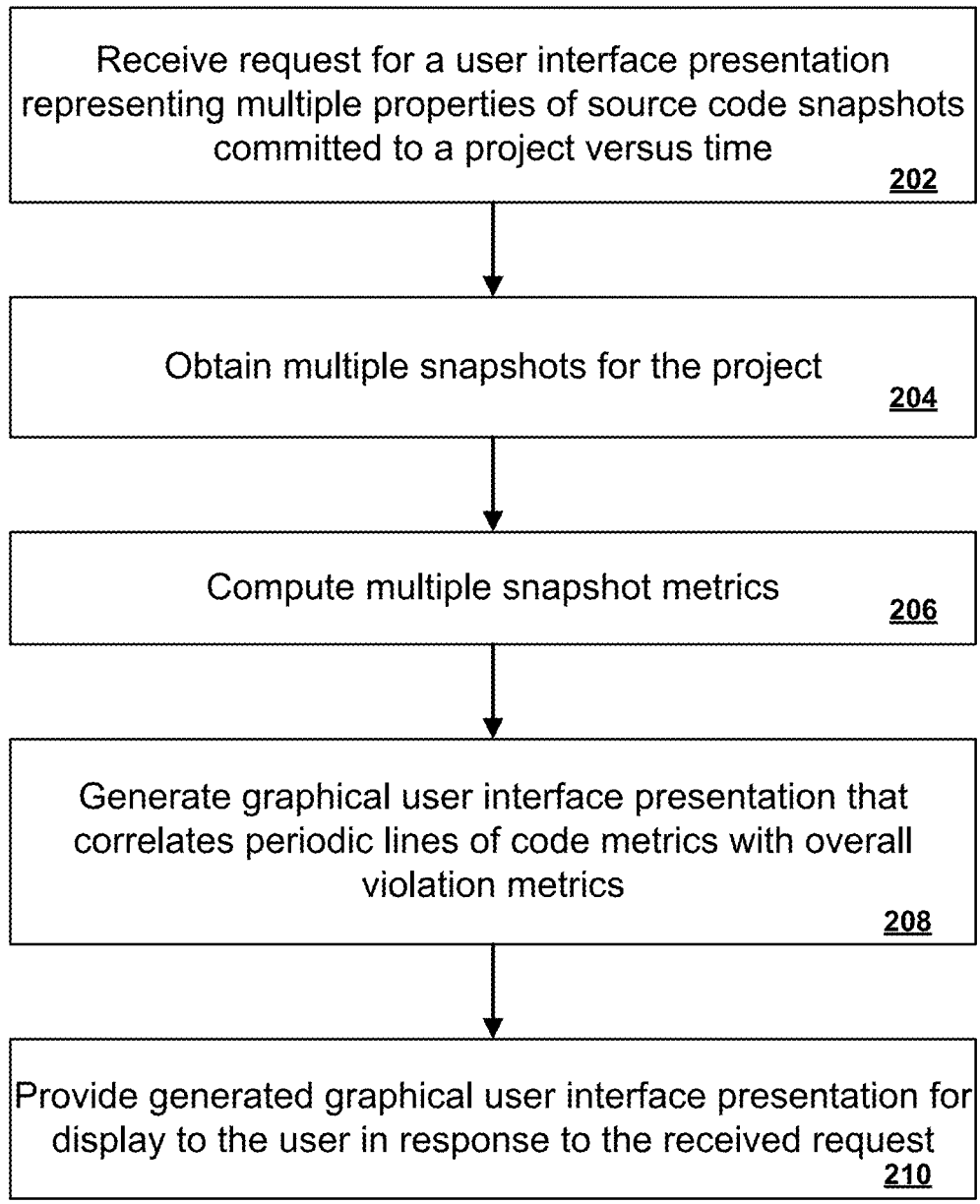
FIG. 2 is a flow chart of an example process for generating a graphical user interface presentation representing multiple properties of source code snapshots committed to a project versus time.

FIG. 2 is a flow chart of an example process for generating a graphical user interface presentation representing multiple properties of source code snapshots committed to a project versus time. For convenience, the example process will be described as being performed by a system of one or more computers, located in one or more locations, and programmed appropriately in accordance with this specification. For example, a static analysis system, e.g., the static analysis system 102 of FIG. 1, appropriately programmed, can perform the example process.

The system receives a request for a user interface presentation representing multiple properties of source code snapshots committed to a project versus time (202).

The system obtains multiple snapshots for the project (204). The system can obtain all or a proper subset of snapshots for a project. For example, the request can specify parameters of snapshots to be processed, e.g., snapshots committed during a particular time range or by particular developer entities.

The system computes multiple snapshot metrics (206). As described above, the system can compute for each snapshot a net violation count for the snapshot that represents violations introduced by the snapshot and violations removed by the snapshot. The system can also compute a number of lines of code added or removed by the snapshot.

The system generates a graphical user interface presentation that correlates periodic lines of code metrics with overall violation metrics (208). Each overall violation metric indicates a number of currently existing violations in a software project. If the number of violations is decreasing, the quality of the project is improving, while if the number of violations is increasing, the quality of the project may not be. In isolation, it is difficult to determine the significance of such changes without additional context about the overall work being performed on the project at the same time.

Therefore, the system can also compute for each of a plurality of time periods lines of code added, lines of code deleted, and net lines of code in order to provide additional context information in the graphical presentation.

The system provides the generated graphical user interface presentation for display to the user in response to receiving the request (210).

Figure 3:
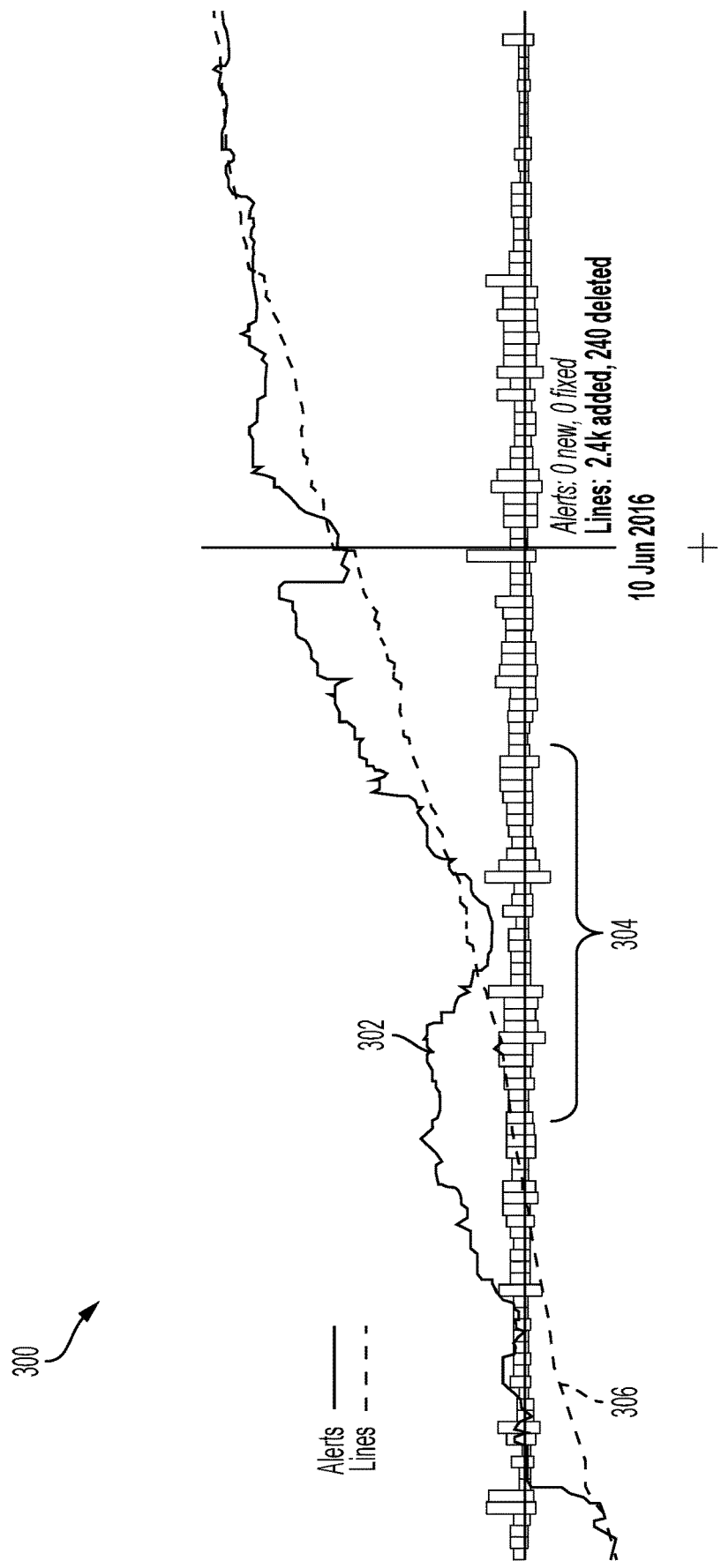
FIG. 3 illustrates an example graphical user interface presentation representing multiple properties of source code snapshots committed to a project versus time.

FIG. 3 illustrates an example graphical user interface presentation 300 representing multiple properties of source code snapshots committed to a project versus time. FIG. 3 illustrates a project history visualization. The project history visualization shows the development of a number of different components over time.

A solid line 302 is a first graphical representation represents overall violations in the project over time. To compute this data, the system can compute the total number of violations found in the project for each of a plurality of points or periods in time. The example presentation 300 also includes a dashed line 306 representing total number of lines of code in the project.

Correlated with this information is a bar chart 304 that represents a number of lines of code added in each time period as well as a number of lines of code removed during the same time period. The bar chart includes for each time period a first rectangular bar extending from an origin in an upward direction with respect to an y-axis of the presentation. The first rectangular bar has a length that is proportional to the total number of lines of code added to the project in the time period. The bar chart also includes for each time period a second rectangular bar extending from the origin in a downward direction with respect to the y-axis of the presentation. The second rectangular bar also has a length that is proportional to the total number of lines of code removed from the project in the time period.

This provides useful context data that is useful for interpreting the violation data. For example, if many violations are being removed, this could simply be a result of deleting unused code rather than the project improving. Similarly, if many violations are being introduced, this could simply be a result of incorporating large swaths of code from another library rather than the project quality decreasing.

The example presentation 300 is an interactive presentation. When a user makes a selection or hovers, e.g., with a mouse, over the plot, the details of a certain day are shown. In the example: on 10 Jun. 2016, new snapshots introduced 2.4 k new lines of code and removed 240 lines of code—none of which changed the number of violation alerts. In addition, the user can also select a reduced or expanded time period, and in response, the presentation can dynamically adjust to redisplay this information over the reduced time period.

The example presentation 300 can also be presented with specific violation information over the particular time period. For example, the presentation 300 can include a graphical representation of violations introduced to the project over the selected reduced or expanded time period. For each displayed violation, the presentation can include text indicating a type of the violation, a time of the violation, or a name of a developer entity who introduced the violation.

Figure 4:
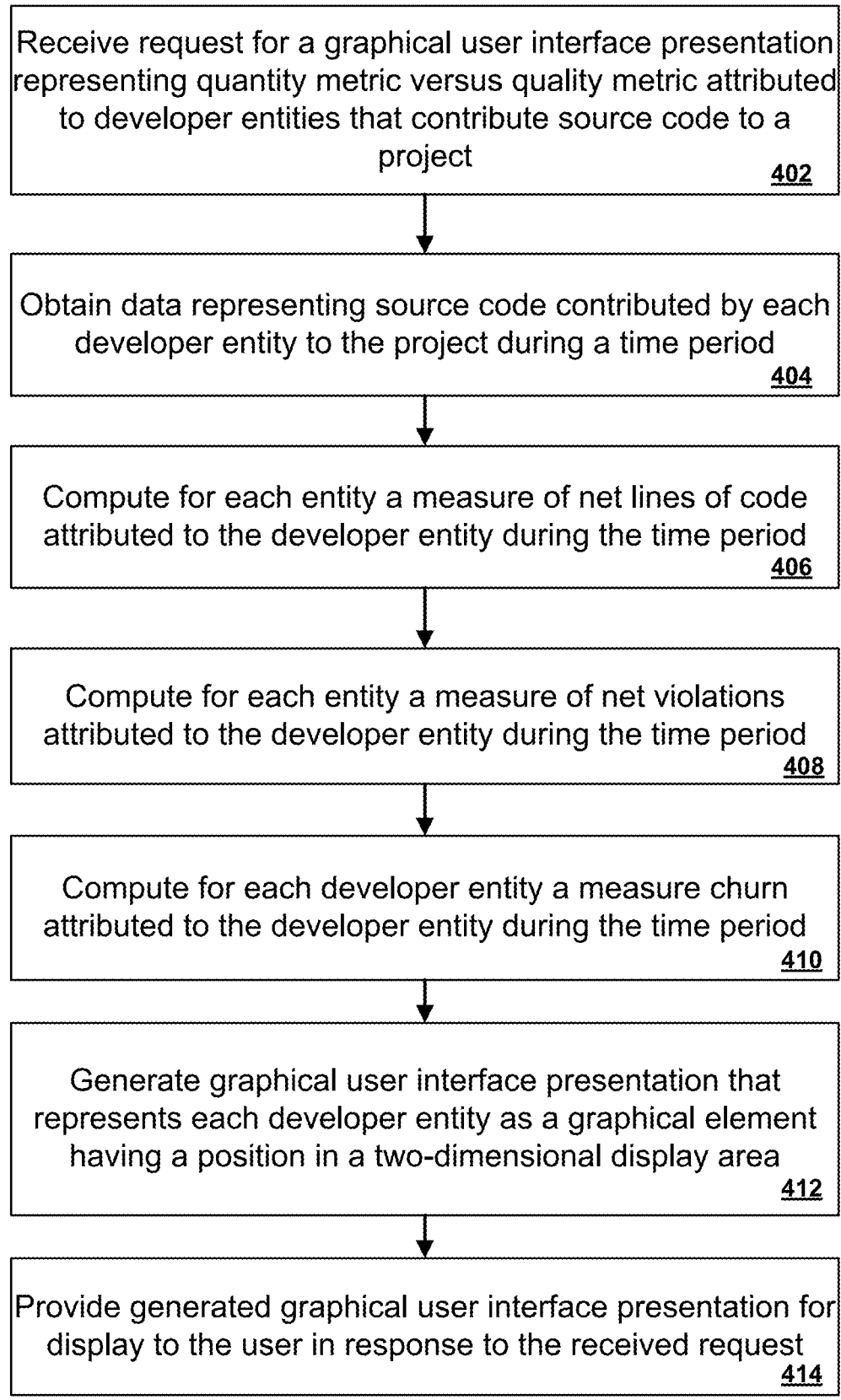
FIG. 4 is a flow chart of an example process for generating a graphical user interface presentation representing a quantity metric versus a quality metric attributed to responsible entities that contributed source code to a project.

FIG. 4 is a flow chart of an example process for generating a graphical user interface presentation representing a quantity metric versus a quality metric attributed to responsible entities that contributed source code to a project. For convenience, the example process will be described as being performed by a system of one or more computers, located in one or more locations, and programmed appropriately in accordance with this specification. For example, a static analysis system, e.g., the static analysis system 102 of FIG. 1, appropriately programmed, can perform the example process.

The system receives a request for a graphical user interface presentation representing a quantity metric versus a quality metric attributed to developer entities that contribute source code to a project (402). The request can include a particular time range in order to constrain the data that is processed.

As described above, the request can be received by a distributed static analysis system that provides cloud-based static analysis capabilities, and the request can be provided by a user device that communications with the static analysis system over a network. Alternatively, the static analysis system can be installed on the user device and can use metrics computed by the user device or computed by a cloud-based static analysis system.

The system obtains data representing source code contributed by each developer entity to the project during a time period (404). In other words, the system can process all snapshots committed by each developer entity during the time period or process data representing metrics computed over such snapshots.

The system computes for each developer entity a measure of net lines of code attributed to the developer entity during the time period (406). As described above, net lines of code over the time period can be computed as lines of code added minus lines of code deleted.

The system computes for each developer entity a measure of net violations attributed to the developer entity during the time period (408). As described above, net violations can be computed as violations introduced minus violations removed. It is not uncommon for this value to be negative, in the case of a developer entity who removes more violations from the code base than the developer entity introduces.

The system computes for each developer entity a measure of churn attributed to the developer entity during the time period (410). As described above, churn can be computed as lines of code added, deleted, or modified. Churn can be a useful metric for overall productivity, but it is also more vulnerable to intentional manipulation. For example, adding 100 lines of code in a snapshot and then deleting them all in the next snapshot would give the developer entity 200 lines of churn, even though no actual production code had been produced. Nevertheless, churn is still useful for identifying the most active developers on a project.

The system generates a graphical user interface presentation that represents each developer entity as a graphical element having a position in a two-dimensional display area (412) and provides the generated graphical user interface presentation for display to the user in response to the received request (414). The position can be determined by the computed metrics for net lines of code and net violations. In other words, the x-coordinate of the position can be determined by the net lines of code, and the y-coordinate of the position can be determined by the net violation alerts.

Figure 5:
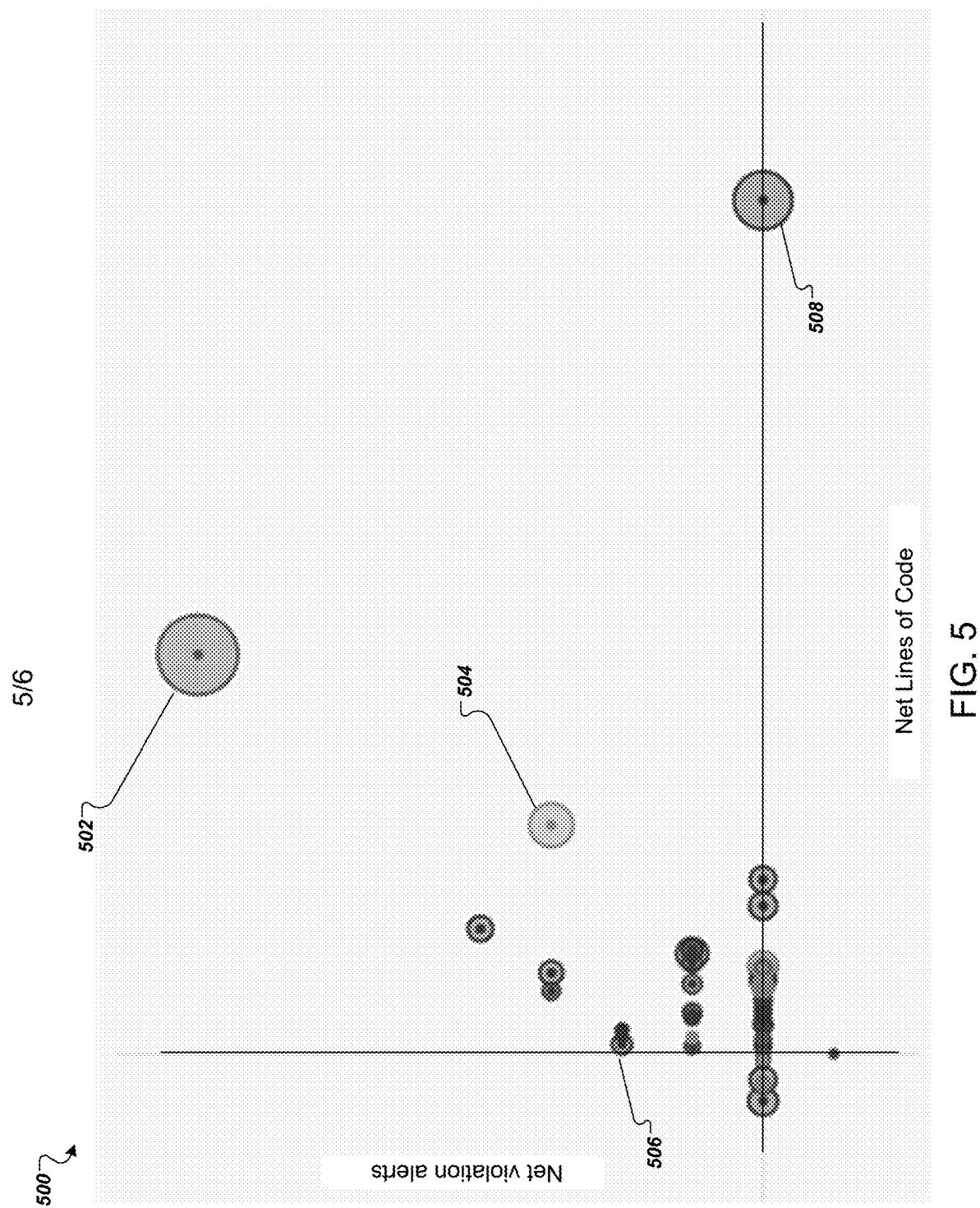
FIG. 5 illustrates an example graphical user interface presentation representing a quantity metric versus a quality metric attributed to responsible developer entities that contributed source code to a project.

FIG. 5 illustrates an example graphical user interface presentation representing a quantity metric versus a quality metric attributed to responsible developer entities that contributed source code to a project. FIG. 5 illustrates a project contributor overview. The project contributor overview does not have a time dimension: it shows the quantity and quality of contributions from different contributors over all time or a predefined time window. Every graphical element represents a contributing developer entity, which can be an individual or a group of individuals, e.g. grouped by team, company, location, or pay grade, to name just a few examples.

The horizontal axis indicates the net contribution in terms of lines of code of a contributor. A contributor with a negative net contribution has deleted more lines than they have added. Note that a contributor with 0 net lines of code, e.g., contributor 506, is not necessarily a small contributor: their contribution is simply very well balanced in terms of added and removed lines of code.

The vertical axis indicates the net number of violation alerts attributed to the contributor; with lower being better. Therefore, the presentation illustrates that the contributor 508 has introduced fewer net violations than the contributor 502, which can be an indication that the contributor 508 is more experienced than the contributor 502.

The size of each graphical element indicates the measure of churn computed for the developer entity. A bigger data point indicates a more significant contributor. Therefore, from the presentation 500 it can immediately be seen that the contributor 502 is more significant than the contributor 504.

Figure 6:
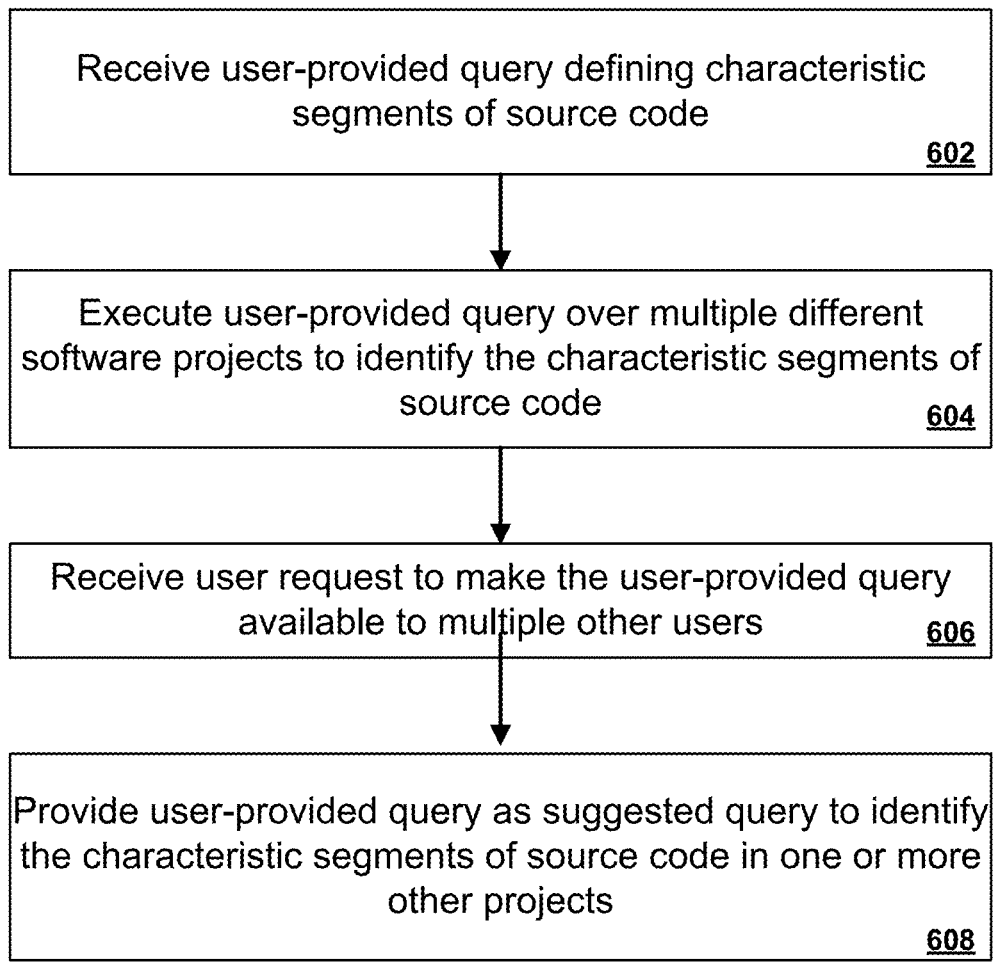
FIG. 6 is a flowchart of an example process for crowd sourcing source code queries.

FIG. 6 is a flowchart of an example process for crowd sourcing source code queries. For convenience, the example process will be described as being performed by a system of one or more computers, located in one or more locations, and programmed appropriately in accordance with this specification. For example, a static analysis system, e.g., the static analysis system 102 of FIG. 1, appropriately programmed, can perform the example process.

The system receives through an online user interface presentation a user-provided query defining one or more characteristic segments of source code (602). For example, when a user logs onto the online static analysis system website, the website can provide a user interface presentation that allows the user to enter a query. Each query specifies the definition of a source code violation to be found across source code snapshots.

The system executes the user-provided query over one or more different software projects to identify the characteristic segments of source code in each software project (604). When the user submits the query, the system can execute the query on a database generated from analyzing each software project. The query can be executed against only a single project owned by the user, a selected subset of projects, or by all projects in the system. As described above, the system can contain tens of thousands of software projects, and thus, a single query can potentially identify many violations in many different software projects.

The system receives a user request to make the user-provided query available to multiple other users (606). If the user has identified a query that is useful, the system can provide an indication to the system that the query should be made available to other users of the system.

The system provides the user-provided query as a suggested query to identify the characteristic segments of source code in the one or more other projects (608). For example when other users of the same or of different software projects log on to the online static analysis system, the system can present suggestions for queries that other users found helpful. The suggestions can identify the user that authored the query as well as other statistics about the query in terms of violations identified or popularity.

The system can determine queries to suggest in a number of ways. For example, the system can compute a number of times that user-provided query was executed overall or the number of times that a user provided query was executed by other users who did not author the query. The system can alternatively or in addition provide other users with the ability to vote on or rate user-provided queries in the system. The system can use one or more of these metrics to compute a score for each user-provided query in order to select queries to suggest to other users. In some implementations, the system filters the queries by language type. Therefore, the system can recommend only Java-specific queries for users of Java projects.

Users who receive the query suggestions can select a suggested query in order to run the query against one or more software projects. In response, the system can execute the query against the selected software projects and display results to the user.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A system configured to display a graphical user interface having a particular visual layout designed to facilitate display of a project history visualization representing multiple properties of source code snapshots committed to a project over a determined time period, where each property of the multiple properties is simultaneously displayed with one another within the same project history visualization in order to provide a combined context that comprehensively represents overall work performed on said project, the system comprising:
    one or more computers and one or more storage devices storing instructions that are operable, when executed by the one or more computers, to cause the one or more computers to perform operations comprising:
        receiving, from a user, a request for a user interface presentation representing multiple properties of source code snapshots committed to a project versus time;
        obtaining a plurality of snapshots for the project, wherein each snapshot comprises a representation of source code for the project at a respective time period;
        computing, for each snapshot of the plurality of snapshots, multiple snapshot metrics, including:
            a net violation count representing a number of violations introduced minus violations removed, wherein at least one violation included in the violations is defined by a crowd sourcing source code query, the crowd sourcing source code query being a user-provided query specifying a user-defined definition of a specific source code violation, and
            a count of lines of code added or removed by the snapshot;
        generating a graphical user interface presentation that correlates periodic lines of code metrics with overall violation metrics in a project history visualization, the graphical user interface presentation comprising:
            a first graphical representation of a change in overall net violations in the project over time, and
            for each time period of a plurality of time periods, a respective second graphical representation of a total number of lines of code added to and removed from the project in the time period,
            wherein the first graphical representation and the second graphical representation are simultaneously displayed with one another as the project history visualization such that a first context of the first graphical representation is not isolated from a second context of the second graphical representation and such that the first context and the second context, as a combination, reflect properties regarding overall work being performed on said project; and
        providing the generated graphical user interface presentation for display to the user in response to the request.

2. The system of claim 1, wherein the first graphical representation comprises a line chart representing the change in overall net violations in the project over time.

3. The system of claim 1, wherein the second graphical representation comprises a line chart representing the change in total number of lines of code in the project over time.

4. The system of claim 1, wherein the second graphical representation comprises a bar chart representing the total number of lines of code added to and removed from the project.

5. The system of claim 4, wherein the bar chart comprises, for each time period in the plurality of time periods:
 a first rectangular bar extending from an origin in an upward direction with respect to an y-axis of the second graphical representation, the first rectangular bar having a length that is proportional to the total number of lines of code added to the project in the time period; and
 a second rectangular bar extending from the origin in a downward direction with respect to the y-axis of the second graphical representation, the second rectangular bar having a length that is proportional to the total number of lines of code removed from the project in the time period.

6. The system of claim 1, wherein the generated graphical user interface presentation further comprises a third graphical representation of (i) a number of violations introduced minus violations removed, and (ii) a number of lines of code added or removed at a particular time period that appears when the user selects or hovers over a portion of the graphical user interface presentation that corresponds to the particular time period.

7. The system of claim 6, wherein the third graphical representation comprises text indicating (i) the number of violations introduced minus violations removed, and (ii) the number of lines of code added or removed at a particular time period.

8. The system of claim 7, wherein the text further indicates the particular time period.

9. The system of claim 1, wherein upon receiving user selection of a reduced time period, the method further comprises:
 displaying a second graphical user interface presentation that correlates periodic lines of code metrics with overall violation metrics for a duration of the reduced time period.

10. The system of claim 9, wherein the second graphical user interface presentation comprises a third graphical representation of violations introduced to the project during the reduced time period.

11. The system of claim 10, wherein the third graphical representation comprises text indicating one or more of (i) type of violation, (ii) developer entity who introduced the violation, and (iii) time of violation.

12. The system of claim 1, wherein the time periods comprise days.

13. A method displaying a graphical user interface having a particular visual layout designed to facilitate display of a project history visualization representing multiple properties of source code snapshots committed to a project over a determined time period, where each property of the multiple properties is simultaneously displayed with one another within the same project history visualization in order to provide a combined context that comprehensively represents overall work performed on said project, the method comprising:
 receiving, from a user, a request for a user interface presentation representing multiple properties of source code snapshots committed to a project versus time;
 obtaining a plurality of snapshots for the project, wherein each snapshot comprises a representation of source code for the project at a respective time period;
 computing, for each snapshot of the plurality of snapshots, multiple snapshot metrics, including:
  a net violation count representing a number of violations introduced minus violations removed, wherein at least one violation included in the violations is defined by a crowd sourcing source code query, the crowd sourcing source code query being a user-provided query specifying a user-defined definition of a specific source code violation, and
  a count of lines of code added or removed by the snapshot;
 generating a graphical user interface presentation that correlates periodic lines of code metrics with overall violation metrics in a project history visualization, the graphical user interface presentation comprising:
  a first graphical representation of a change in overall net violations in the project over time, and
  for each time period of a plurality of time periods, a respective second graphical representation of a total number of lines of code added to and removed from the project in the time period,
  wherein the first graphical representation and the second graphical representation are simultaneously displayed with one another as the project history visualization such that a first context of the first graphical representation is not isolated from a second context of the second graphical representation and such that the first context and the second context, as a combination, reflect properties regarding overall work being performed on said project; and
 providing the generated graphical user interface presentation for display to the user in response to the request.

14. The method of claim 13, wherein the first graphical representation comprises a line chart representing the change in overall net violations in the project over time.

15. The method of claim 13, wherein the second graphical representation comprises a line chart representing the change in total number of lines of code in the project over time.

16. The method of claim 13, wherein the second graphical representation comprises a bar chart representing the total number of lines of code added to and removed from the project.

17. The method of claim 16, wherein the bar chart comprises, for each time period in the plurality of time periods:
 a first rectangular bar extending from an origin in an upward direction with respect to an y-axis of the second graphical representation, the first rectangular bar having a length that is proportional to the total number of lines of code added to the project in the time period; and
 a second rectangular bar extending from the origin in a downward direction with respect to the y-axis of the second graphical representation, the second rectangular bar having a length that is proportional to the total number of lines of code removed from the project in the time period.

18. The method of claim 13, wherein the generated graphical user interface presentation further comprises a third graphical representation of (i) a number of violations introduced minus violations removed, and (ii) a number of lines of code added or removed at a particular time period that appears when the user selects or hovers over a portion of the graphical user interface presentation that corresponds to the particular time period.

19. The method of claim 13, wherein the time periods comprise days.

20. A computer system configured to display a graphical user interface having a particular visual layout designed to facilitate display of a project history visualization representing multiple properties of source code snapshots committed to a project over a determined time period, where each property of the multiple properties is simultaneously displayed with one another within the same project history visualization in order to provide a combined context that comprehensively represents overall work performed on said project, the computer system comprising:
one or more processors; and
one or more computer-readable hardware storage devices having stored thereon computer-executable instructions that are executable by the one or more processors to cause the computer system to at least:
receive a request for a user interface presentation representing multiple properties of source code snapshots committed to a project versus time;
obtain a plurality of snapshots for the project, each snapshot comprising a representation of source code for the project at a respective time period;
compute, for each snapshot of the plurality of snapshots, multiple snapshot metrics, including:
a net violation count representing a number of violations introduced minus violations removed, wherein at least one violation included in the violations is defined by a crowd sourcing source code query, the crowd sourcing source code query being a user-provided query specifying a user-defined definition of a specific source code violation, and
a count of lines of code added or removed by the snapshot;
display a graphical user interface presentation that is representative of a project history visualization for said project, the graphical user interface including:
a first graphical representation of a change in overall net violations in the project over time, and
a second graphical representation identifying, for each time period in a plurality of time period, a total number of lines of code added to and removed from the project during said each time period,
wherein the first graphical representation and the second graphical representation are simultaneously displayed with one another as the project history visualization such that a first context of the first graphical representation is not isolated from a second context of the second graphical representation and such that the first context and the second context, as a combination, reflect properties regarding overall work being performed on said project.

21. The computer system of claim 20, wherein the computer system provides the crowd sourcing source code query as a suggested query to be executed against one or more other source code projects to determine whether the one or more other source code projects include the specific source code violation.

* * * * *